Figure 1:
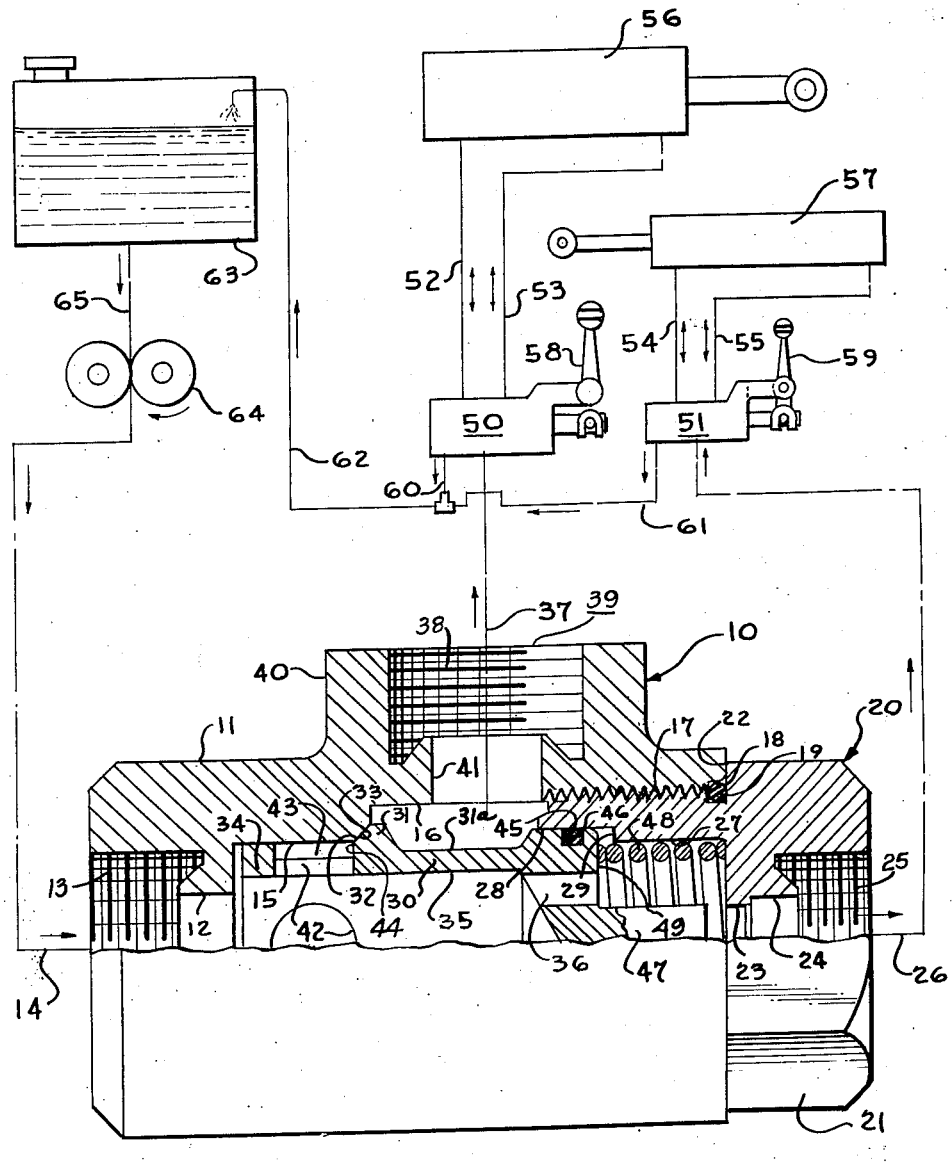

Oct. 27, 1959 — O. H. BANKER — 2,910,085
FLOW DIVIDER
Filed Aug. 7, 1956 — 2 Sheets-Sheet 1

INVENTOR.
Oscar H. Banker
BY
Charles O. Vajtech
Attorney

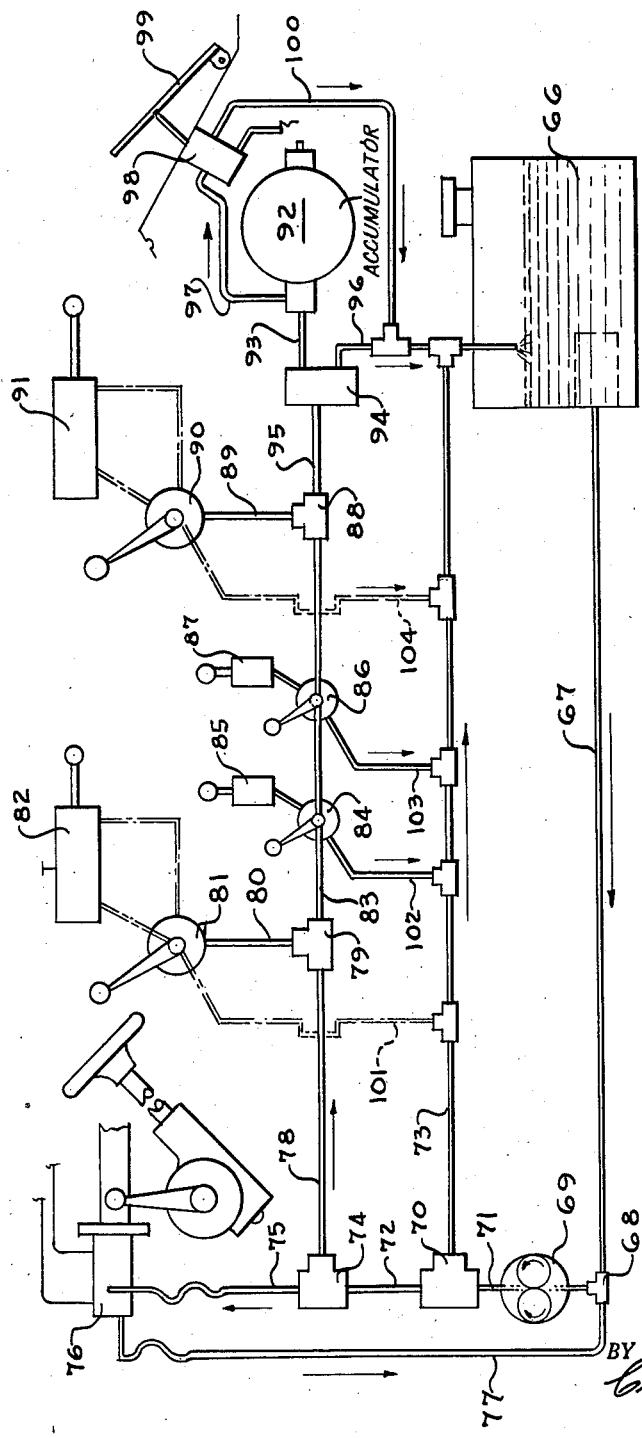

United States Patent Office 2,910,085
Patented Oct. 27, 1959

2,910,085
FLOW DIVIDER
Oscar H. Banker, Evanston, Ill., assignor to New Products Corporation, Skokie, Ill., a corporation of Delaware Application August 7, 1956, Serial No. 602,581
8 Claims. (Cl. 137—101)

This invention relates to a device for dividing a fluid stream into two streams, with a predetermined proportion of the fluid flowing in each of the two streams; it relates also to a system in which this flow dividing device may be used.

The principal object of this invention is to provide a flow divider for a fluid stream which eliminates the need for close machining in its formation and hence is inexpensive to make.

A more specific object of this invention is the provision of a flow divider for a fluid stream which eliminates rotating parts such as the intermeshing gears generally used for this purpose, but which uses instead axially reciprocable valve parts which are not lapped nor precision ground or honed.

As another specific object this invention seeks the provision of a flow divider which may function also as a relief valve to prevent the building up of excessive pressures in one of the outlet streams.

It is another object of this invention to provide a device which under normal conditions acts as a flow divider for a fluid stream, but under abnormal conditions in which the flow of fluid is materially decreased, acts to conserve the fluid by completely shutting off one of the outlet streams and allowing all of the fluid to flow through the other of the streams, thereby assuring the operation of an essential mechanism such as a power steering device or the like on a vehicle.

A further object of this invention is the provision of a pressure fluid operated system incorporating a plurality of hydraulically operated devices all deriving pressure fluid from the same source, one of the devices being of such character that its operation must be assured, even though the source of fluid under pressure fails. More specifically, it is an object of this invention to provide, in an automotive vehicle having power operated steering, windshield wiper, convertible top, seat, etc. and brakes, all operated from a single pump, means for ensuring operation of the brakes even though the supply of pressure fluid may fail either because the pump ceases to function, or the line from the pump may break.

These and other objects of this invention may become apparent from the following description when taken together with the accompanying drawings in which, Fig. 1 is a schematic representation of a pressure fluid system showing the flow dividing device of this invention enlarged with respect to the remainder of the system and in quarter section to show the interior thereof; and Fig. 2 is a schematic representation of another pressure fluid system showing how a plurality of the flow dividing devices of this invention may be utilized to provide operating fluid to the various elements of the system.

In the description to follow, the construction and operation of the flow dividing device will be described first, followed by a description of the systems in which it may be utilized.

Referring now to Fig. 1, the flow dividing device of this invention is shown generally at 10 and is comprised of a body 11 having a through bore 12 and a threaded counterbore 13 at the left hand side of bore 12 as viewed in Fig. 1 to receive a suitable fitting by which an inlet pipe, shown schematically at 14, may be connected to the device. On the other side of bore 12 is a first counterbore 15, a second counterbore 16, which has an internal thread 17 formed over the right hand end thereof, and a short counterbore 18 at the outer end of counterbore 16 in which is disposed a gasket 19 in the form of an elastomeric O-ring of well-known design.

Threaded into the threaded portion 17 of counterbore 16 is a cap 20 having a hexagonal head 21 which forms a shoulder 22 extending across counterbore 18. The axial thickness of O-ring 19 is greater than the axial length of counterbore 18 so that when cap 20 is screwed into place against the end of body 11, the O-ring will be compressed to form a fluid-tight seal. Cap 20 has a small opening 23 adjacent a counterbore 24 which latter opens into a larger counterbore 25 threaded to receive a fitting (not shown) by which cap 20 may be connected to an outlet pipe shown schematically at 26. On the left of small opening 23, as viewed in Fig. 1, is a relatively large counterbore 27 opening into a still larger counterbore 28 and connected thereto by a shoulder 29.

Slidably received within counterbore 28 is a plunger 30 on which is formed a flange 31 having a tapered surface 32 designed to form a fluid-tight seal with a similarly tapered seat 33 formed on the end of counterbore 15. Thus surface 32 and seat 33 comprise elements of a poppet valve. Plunger 30 extends beyond flange 31 into counterbore 15 to form a guide 34. The interior of plunger 30 is bored out at 35 to establish communication with through bore 12 and inlet pipe 14. Communication with outlet pipe 26 is established by an opening 36 in the end of plunger 30 which connects bore 35 with counterbore 27 and then through opening 23 and counterbore 24 to pipe 26.

It may be apparent from the description thus far given that pipe 26 constitutes one of the streams into which the inlet stream from pipe 14 is divided. The other stream is indicated schematically at 37 and may comprise a pipe adapted to be connected through an appropriate fitting (not shown) to the threaded interior 38 of a side opening 39 formed in a boss 40 extending laterally from body 11. A connecting passage 41 is drilled into body 11 between side opening 39 and counterbore 16 to establish fluid communication from the exterior of plunger 30 to side opening 39. A peripheral groove 31a is formed adjacent to, and in part by, flange 31 and promotes free and unrestricted flow of fluid around plunger 30. A plurality of cross bores 42 connect bore 35 within plunger 30 to a peripheral groove 43 on the exterior of guide 34, one radial wall 44 of said groove intersecting the tapered surface 32 on flange 31 so that when plunger 30 is moved to the right as viewed in Fig. 1 to separate surface 32 from seat 33, groove 43 will be in fluid communication with counterbore 16 and thence, through connecting passage 41, to side opening 39. A seal, preferably in the form of an O-ring 45 compressed in a peripheral groove 46, prevents an intermingling of the two streams and at the same time permits axial movement of plunger 30 in counterbores 15 and 28. The interior of the valve body 10 is thus divided by plunger 30 into three chambers, the first of which being that portion of the interior extending to the left of flange 31 as viewed in Fig. 1, the second being the portion extending to the right of seal 45 and the third being the portion intermediate flange 31 and seal 45. The first and second chambers may be termed the "primary" and "secondary" chambers.

Flow of fluid out of the secondary chamber formed by counterbore 27 adjacent small outlet opening 23 is metered by a cylindrical extension 47 formed on the right hand end (Fig. 1) of plunger 30 and extending into proximity with opening 23. The cross sectional area of extension 47 is equal to, or slightly greater than the cross sectional area of opening 23 so that movement of the extension 47 toward opening 23 will tend to restrict flow of fluid from counterbore 27 to opening 23.

The axial position of plunger 30 in body 11 is determined by the balance established between fluid under pressure in counterbore 15 tending to push plunger 30 to the right as viewed in Fig. 1 and counterbalancing forces established on the one hand by the fluid under pressure in counterbore 27 acting upon the plunger in the opposite direction and by a spring 48 on the other hand disposed in counterbore 27 and compressed between cap 21 and the end 49 of plunger 30. In the form illustrated in Fig. 1, the axial length of extension 47 is less than the axial length of counterbore 27 so that when plunger 30 is moved to the right as viewed in Fig. 1 until it bottoms on shoulder 29, the free end of extension 47 is still spaced from opening 23 to allow fluid to flow through the plunger into counterbore 27 and out through opening 23. With this arrangement, a sudden surge in the inlet pipe 14 will not result in closing off the flow into outlet pipe 26, and hence continued operation of the fluid pressure device or devices that depend on the presence of fluid under pressure in pipe 26 is assured. The amount of space remaining between the free end of extension 47 and opening 23 after plunger 30 bottoms on shoulder 29 may, of course, be varied by altering the length of extension 47.

It may be apparent that movement of plunger 30 in response to fluid pressure is dependent upon the strength of spring 48. The relative quantities of fluid flowing in pipes 26 and 37 are determined by the position of plunger 30 in respect to opening 23 and seat 33. Thus no fluid will flow in pipe 37 until the force of spring 48 is overcome and tapered surface 32 of plunger 30 is moved away from seat 33. After that, the size of the opening between surface 32 and seat 33 and the pressure of the fluid in pipe 14 will determine the quantity of fluid passing through said opening. Since opening 23 leading to pipe 26 is never closed in the form shown in Fig. 1, there will be a division of the stream of fluid in pipe 14 between pipes 37 and 26 so that the device will function as a flow divider. The operation of the device is also influenced by the relative diameters of counterbores 15 and 28 in that if the diameter of counterbore 28 exceeds that of counterbore 15, a net effective pressure in the direction of closing off the flow to pipe 37 is created when the quantity of fluid flowing in pipe 14 diminishes to a predetermined value and the fluid pressure in counterbore 15 is less than the combined pressures of the spring 48 and the fluid in counterbore 28.

The utility of the flow dividing device of this invention can best be illustrated by showing how it can be made to function to supply two or more open center valve devices with fluid under pressure in adequate quantities. It is of course obvious that since an open center valve continuously vents the fluid supply when the valve is in neutral position, it would be impossible to operate an open center valve with any other fluid pressure operated device from a single source of pressure fluid unless a flow divider were used to separate the pressure fluid into two separate streams. For purposes of illustration, the flow dividing device 10 is shown in Fig. 1 as supplying fluid to two open center valve devices 50 and 51. The construction of such devices is well known and hence these devices are shown only in outline. They may comprise four way valves having pipes 52, 53 and 54, 55 connecting on the one hand pipe 37 to opposite sides of a work cylinder 56, and pipe 26 on the other hand to a work cylinder 57. Any suitable lever means 58 and 59 may be utilized to control valves 50 and 51 respectively. Both valves may be connected through pipes 60 and 61 to a common return or vent pipe 62 which returns the exhaust or excess fluid to a reservoir 63. The fluid may be drawn from reservoir 63 and pressurized by any suitable pump, shown schematically at 64, connected on its inlet or low side to the reservoir by a pipe 65, and connected on its outlet or high side to pipe 14.

As an example, let it be assumed that work cylinders 56 and 57 are accessories on a farm tractor, such as a hydraulic lift for the implements pulled by the tractor and a power steering mechanism, respectively. Since it is important for the safety of the farmer that the power steering mechanism functions unfailingly, it is connected to pipe 26 which, as described above, is always assured of operative fluid as long as the pump is running, whereas pipe 37 may, under low engine speed conditions, be starved or, in fact, completely shut off from the pump. To make certain that work cylinder 57 always has a sufficient quantity of fluid under pressure, the capacity of pump 64 is calculated to be considerably greater than the maximum needed, with the result that more fluid under pressure will be available in pipe 37 than in pipe 26 and hence work cylinder 56 may be safely larger than work cylinder 57.

*Operation*

Assuming now that pump 64 is in operation and is drawing fluid from reservoir 63 and forcing it under pressure through line 14 and bore 12 into counterbore 15 and bore 35 in plunger 30, said fluid will pass through opening 36 into counterbore 27 and out through small opening 23 into pipe 26 and valve 51. If valve 51 is in neutral position at the time, the fluid will pass directly to pipe 61 and then through pipe 62 back to reservoir 63. Since pump 64 is driven by the tractor engine, which is controlled by a governor normally set to permit a high engine speed, the flow from the pump is much in excess of the quantity that can pass through opening 36. Pressure will therefore be built up in bore 35 and counterbore 15 to the point where the fluid pressure in counterbore 27 and the pressure of spring 48 will be overcome and plunger 30 will move to the right as viewed in Fig. 1. This creates an opening between conical surface 32 and its seat 33 through which the excess fluid will flow into counterbore 16, connecting passage 41, pipe 37 and valve 50. If valve 50 is at that time set for neutral operation, the fluid will vent into pipes 60 and 62 and back to reservoir 63. As long as valves 50 and 51 are in neutral position, the flow from pump 64 is divided between pipes 26 and 37 in a definite proportion as determined by the cross sectional area of opening 36. If valve 51 is operated to a position other than neutral while valve 50 is in neutral, the pressure in pipe 26 will increase to something less than that in bore 35, while that in pipe 37 will be that resulting from free flow of the fluid in said pipe 37. The increase in pressure in pipe 26 will, of course, increase the pressure in counterbore 27 thus tending to move plunger 30 back toward seat 33. This restricts flow of fluid past seat 33 thus assuring cylinder 57 of an adequate quantity of fluid under pressure to perform its intended function.

Assuming now that valve 50 is moved to a position other than neutral to cause work cylinder 56 to function, pressure in pipe 37 will increase because the vent portion of the valve (not shown) is closed. The increased pressure in pipe 37 will be reflected back to counterbore 15, and if at that time the pressure in said counterbore is less than that in pipe 37, the pressure in the counterbore will tend to increase, thereby moving plunger 30 to the right as viewed in Fig. 1 against the resistance of spring 48 to restrict the passage between the end of plunger extension 47 and opening 23 until a pressure balance is restored. The passage between the extension and opening is so calibrated that when valve 50 is admitting fluid to cylinder 56 at maximum pressure and valve 51 is in neutral position at that maximum pressure in counterbore 15, the flow through opening 23 will still be at the same rate as when both valves 50 and 51 are in neutral positions. This maintains a flow of high pressure fluid through passage 41 and valve 50 without causing an excessive flow through openings 36 and 23, and hence results in an efficient use of the pumped fluid.

When both valves 50 and 51 are simultaneously in positions other than neutral, that is, when both cylinders 56 and 57 are working, the position of plunger 30 will be substantially the same as when both valves are in neutral. The flow in pipes 26 and 37 will therefore be in the same proportion as when neither cylinder is working.

It is apparent from the foregoing description that the device 10 will divide the flow from pipe 14 and maintain a controlled, definitely proportioned flow in pipes 26 and 37 regardless of variations in pressure in pipes 26 and 37 from zero to maximum. It may also be observed that device 10, since it always assures a flow of fluid in pipe 26 and plunger 30 is urged by spring 48 to cut off flow into pipe 37, may function as a relief valve. When the pressure in counterbore 15 is too low to overcome spring 48, plunger 30 will be moved to the left as viewed in Fig. 1 to cut off flow into pipe 37, but upon the presence of a surge in pipe 14 sufficient to overcome spring 48, plunger 30 will move to the right as viewed in Fig. 1 to admit fluid into pipe 37 and thereby lower the pressure to the value desired in pipe 26.

It is possible to provide a single-pump hydraulic system for operating all power operated devices on a vehicle such as a passenger car of the folding top or convertible type. These devices may include power steering, convertible top operating cylinder, window raising and lowering devices, seat mover, windshield wiper and power brakes. The valves for controlling such double acting cylinders as may be incorporated in the system are preferably of the open center, rather than the closed center type.

A single pump, open center valve system for the devices of an automotive vehicle enumerated above is shown in Fig. 2, to which attention is now directed. The system incorporates a reservoir or tank 66 of fluid connected by a pipe 67 to a T 68, one branch of which is connected to the intake of a pump 69. Said pump 69 is normally driven by the engine of the vehicle and is permanently connected thereto by a constant ratio drive. The output or high side of the pump is connected to a flow divider 70 of the type shown at 10 in Fig. 1. The inlet 71, straight-through outlet 72 and side outlet 73 correspond respectively with inlet 14, straight-through outlet 26 and side outlet 37 of device 10. Straight-through outlet 72 is the inlet of a second flow divider 74 having a straight-through outlet 75 constituting the inlet to an open center power steer valve 76 of known construction or which may be of the type shown in my copending application for Open Center Valve, Serial No. 565,176, filed February 13, 1956. The exhaust 77 from power steer valve 76 is connected to the second branch from T 68, or it may be connected to any return or vent line in the system.

Since the straight-through line in the device 10 is always assured of fluid whether or not there is sufficient fluid to flow into the side outlet, and since it is important to the safety of the vehicle driver that the steering mechanism be operative at all times, the straight-through lines in flow dividers 70 and 74 are connected together and to power steer valve 76.

The first flow divider 70 functions as a safety device for the system. If the speed of the engine driving pump 69 should become excessive so that the quantity of fluid pumped into pipe 71 would be more than flow divider 74 could safely handle, flow divider 70 will act to divert part of the fluid away from flow divider 74. This action is brought about by making the bore 15 of flow divider 70 of greater cross sectional area than the area of bore 28, and by making spring 48 correspondingly stronger. Under these conditions, assuming an excessively large build-up of pressure in pipe 72, the same pressure acting on the larger area of the plunger in bore 15 will move the plunger to the right to open the passage to pipe 73 and thus relieve the excessive pressure in pipe 72. Plunger extension 47 will under these conditions be made shorter to allow a greater movement of the plunger.

With flow divider 70 acting to relieve excessive pressure, the customary relief valve at pump 69 can be dispensed with.

Side outlet 78 from flow divider 74 supplies the remainder of the system with operating fluid. It may be connected to the inlet of a third flow divider 79, the side outlet 80 of which is connected to an open center valve 81 controlling the operation of a double acting motor 82. The straight-through outlet 83 from valve 79 is connected to a two-way valve 84 controlling a single acting (spring-return) motor 85 which may be used to raise and lower the vehicle windows. A second two-way valve 86 may be connected to receive pressure fluid from outlet 83, said second valve controlling a single-acting (spring-return) motor 87 for moving the vehicle driver's seat forward and backward.

A fourth flow divider 88 may have its inlet connected to receive fluid from straight-through outlet 83 and its side outlet 89 connected to an open center valve 90 controlling a double-acting motor 91 utilized to operate the vehicle windshield wiper (not shown).

The vehicle brakes are perhaps the most important power operated mechanisms on the vehicle since failure to stop a moving vehicle, or to hold a vehicle on an incline renders the vehicle dangerously out of control. The operation of the brakes must therefore be assured, even though pump 69 may fail completely to supply fluid under pressure, or a break may develop in the outlet line 83. This assured operation is provided by an accumulator 92 in which fluid under pressure is stored. Accumulator 92 is supplied through a pipe 93 from an unloader valve 94 the construction of which may be similar to that described in my copending application, Serial No. 531,154, filed August 29, 1955, for Unloader Valve, now Patent No. 2,793,498. Said unloader valve receives its fluid under pressure from the straight-through outlet pipe 95 from flow divider 88 and vents the excess fluid through pipe 96 from which the fluid is ultimately returned to reservoir 66. Pressure fluid from pipe 93, whether supplied from pipe 95 or from accumulator 92, is conducted through pipe 97 to the brake control valve 98, the excess or vent fluid being returned ultimately to reservoir 66 through pipe 100. Valve 98 may be operated in any known manner from a brake pedal 99.

Suitable return lines 101, 102, 103 and 104 may conduct the vented fluid from motors 82, 85, 87 and 91, respectively, to return pipe 73.

It may be observed that flow divider 79 is smaller than flow divider 74, and that flow divider 88 is smaller than flow divider 79. This follows from the fact that the supply of fluid decreases each time it is divided. It may also be observed that unloader valve 94 controlling the charging of accumulator 92 is supplied by the straight-through outlet of flow dividers 79 and 88 so that it is assured of whatever fluid supply is available from the side outlet 78 of flow divider 74.

Thus the open center system shown in Fig. 2 makes possible the use of simple, inexpensive flow dividers for supplying fluid under pressure to a plurality of hydraulically operated devices of various kinds, including devices which must be assured of operating fluid at all times such as power-operated brakes.

It is understood that the foregoing description is merely illustrative of preferred embodiments of the invention and that the scope of the invention therefore is not to be limited thereto but is to be determined by the appended claims.

I claim:

1. A pressure fluid operated device for establishing a first fluid stream and a second fluid stream, the volume of the second fluid stream being a predetermined proportion of the first-mentioned stream, said device comprising a body having an inlet opening for the reception of a stream of fluid under pressure, an outlet opening in the body for the first said stream coaxially disposed with respect to the inlet opening, a second outlet opening in the body for the second fluid stream, said body having a chamber connecting the inlet and two outlet openings, a plunger slidable in the chamber to assume a plurality of positions therein, said plunger having passages therethrough, one for each stream, individual means on the plunger and body relatively movable to control the volume of fluid passing therethrough to each of said outlet openings, said plunger having an area exposed to the inlet opening and being movable in one direction in response to the flow of fluid into the inlet opening, means for resiliently opposing the movement of the plunger in response to such flow of fluid to regulate the flow through one of the passages, and stop means for the plunger preventing complete shut off of the flow in the said one passage.

2. A pressure fluid operated device as described in claim 1, said individual means including an orifice in one stream and a seat in the other stream, means on the plunger movable toward the orifice to restrict the flow therethrough and means on the plunger movable toward the seat to restrict the flow past the seat.

3. A pressure fluid operated device as described in claim 1, said individual means including an orifice in one stream and a seat in the other stream, said seat and orifice being axially spaced, means on the plunger movable toward the orifice to restrict the flow therethrough, and means on the plunger movable toward the seat to restrict the flow past the seat, both said means on the plunger being disposed between the seat and orifice such that movement of the first-mentioned means on the plunger toward the orifice results in movement of the second mentioned means on the plunger away from the seat.

4. A pressure fluid operated device as described in claim 1, said individual means including an orifice in one stream, and means on the plunger movable toward the orifice to restrict the flow therethrough, said stop means comprising means on the body and cooperable with the plunger to prevent the means on the plunger from completely blocking the orifice, whereby to assure a flow of fluid through said orifice whenever there is fluid flowing into the inlet opening.

5. A pressure fluid operated device comprising a body having a throughbore, a first counterbore on one side of the throughbore, a second counterbore on the said one side of the counterbore, said body having a side opening communicating with the second counterbore, a cap secured to the end of the body over the second counterbore and having an orifice therethrough establishing communication between the second counterbore and the exterior of the body, first and second counterbores on one side of the orifice and opening into the second counterbore, a plunger supported by and reciprocable in the first counterbore of the body and second counterbore of the cap, means effecting a seal between the contacting portions of the plunger and the second counterbore of the cap, an abutment between the first and second counterbores in the body, means on the plunger cooperating with the abutment to restrict or to cut off flow between the plunger and abutment, said plunger having a bore opening at one end to the first counterbore on the body, and an opening in the other end in communication with the bore to provide a passage through the plunger, an extension on the plunger terminating in proximity to the orifice in the cap for restricting the flow through the orifice, stop means on the body engageable by the plunger to limit movement of the plunger toward the orifice, said extension, when the plunger engages the abutment being removed from the orifice to permit flow around the extension through the orifice, said plunger having a passage connecting the bore with that portion of the exterior of the plunger adjacent the seal, and resilient means compressed between the cap and plunger and urging the plunger into sealing contact with the abutment between the first and second counterbores in the body.

6. A flow divider comprising a valve body having primary and secondary chambers therein, a plunger having one end thereof in the primary chamber and the opposite end thereof in the secondary chamber, a poppet valve comprising a valve part on the plunger adjacent the said one end thereof, a valve part on the body cooperating with the first said valve part to control the flow of fluid therebetween, a spring in one of said chambers and acting upon the plunger in a direction to cause the poppet valve to close, said plunger having a restricted opening therethrough connecting the primary and secondary chambers, means on the body defining an inlet to the primary chamber, means defining an outlet port from the secondary chamber, said body defining with the plunger a third chamber intermediate the primary and secondary chambers and in fluid communication with the output side of the poppet valve, means defining an outlet port for the third chamber, said plunger being urged toward the outlet port for the secondary chamber to restrict said opening, and means preventing closing of the outlet port from said secondary chamber.

7. A flow divider comprising a valve body having primary and secondary chambers therein, a plunger having one end thereof in the primary chamber and the opposite end thereof in the secondary chamber, a poppet valve comprising a valve part on the plunger adjacent the said one end thereof, a valve part on the body cooperating with the first said valve part to control the flow of fluid therebetween, a spring in one of said chambers and acting upon the plunger in a direction to cause the poppet valve to close, said plunger having a restricted opening therethrough connecting the primary and secondary chambers, means on the body defining an inlet to the primary chamber, means defining an outlet port from the secondary chamber, coaxially arranged with respect to the plunger, said body defining with the plunger a third chamber intermediate the primary and secondary chambers and in fluid communication with the outlet side of the poppet valve, means defining an outlet port for the third chamber, an extension on the end of the plunger adjacent the outlet port from the secondary chamber and adapted to move into proximity thereto to restrict the flow through said secondary chamber outlet port, and means for preventing closing of the outlet port from said secondary chamber.

8. A pressure fluid operated device for establishing a first fluid stream and a second fluid stream, said device comprising a body having an inlet opening for the reception of a stream of fluid under pressure, an outlet opening in the body for the first said stream, a second outlet opening for the said second stream, said body having a chamber connecting the inlet and two outlet openings, a plunger slidable in the chamber to assume a plurality of positions therein, said plunger having a passage therethrough for one of said streams, individual means on the plunger and body relatively movable to control the volume of fluid passing therethrough to each of said outlet openings, said plunger having an area exposed to the inlet opening and being movable in one direction in response to the pressure of the fluid in the inlet opening to decrease the flow in one stream while increasing the flow in the other stream, means for resiliently opposing the movement of the plunger in response to such pressure of fluid to regulate the flow through one of the passages, and stop means for the plunger to prevent complete shut off of the flow in the said one passage.

References Cited in the file of this patent

UNITED STATES PATENTS

| | | |
|---|---|---|
| 1,999,834 | Ernst | Apr. 30, 1935 |
| 2,674,092 | Gardiner | Apr. 6, 1954 |
| 2,724,335 | Eames | Nov. 22, 1955 |
| 2,733,662 | Hunter | Feb. 7, 1956 |
| 2,737,196 | Eames | Mar. 6, 1956 |